United States Patent
Cochran et al.

(10) Patent No.: US 7,934,069 B2
(45) Date of Patent: Apr. 26, 2011

(54) ENABLING AND DISABLING CACHE IN STORAGE SYSTEMS

(75) Inventors: Robert A Cochran, Sacramento, CA (US); Erik A. Lipps, Sacremento, CA (US); Ayman Abouelwafa, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 800 days.

(21) Appl. No.: 11/796,428

(22) Filed: Apr. 27, 2007

(65) Prior Publication Data

US 2008/0270692 A1 Oct. 30, 2008

(51) Int. Cl.
*G06F 12/02* (2006.01)

(52) U.S. Cl. .................. 711/167; 711/E12.002

(58) Field of Classification Search .............. None
See application file for complete search history.

(56) References Cited

U.S. PATENT DOCUMENTS

| | | | | |
|---|---|---|---|---|
| 6,704,835 | B1 * | 3/2004 | Garner | 711/103 |
| 7,523,271 | B2 * | 4/2009 | Houzenga et al. | 711/151 |
| 2005/0289298 | A1 * | 12/2005 | Savell et al. | 711/122 |
| 2007/0156961 | A1 * | 7/2007 | Houzenga et al. | 711/118 |

* cited by examiner

*Primary Examiner* — Shane M Thomas
*Assistant Examiner* — Ryan Dare

(57) ABSTRACT

Embodiments include methods, apparatus, and systems for enabling and disabling cache in storage systems. One embodiment includes a method that changes a time period for delaying host requests received at a cache of a storage device and converts the storage device from a cache enabled state to a cache disabled state while the storage device is online.

19 Claims, 4 Drawing Sheets

US 7,934,069 B2

ENABLING AND DISABLING CACHE IN STORAGE SYSTEMS

BACKGROUND

Enterprises commonly maintain several tiers of storage that satisfy a wide range of price and performance requirements. Some enterprises utilize virtual storage. Some storage arrays act as a "virtualizer" to other storage arrays and provide customers with more choices for storage tiers.

In spite of the benefits of virtualized or external storage, new challenges arise. One of these challenges is how to handle a loss of connection or service between the virtualizing array and the virtualized or external array. Other challenges exist with respect to efficiently using cache storage.

If storage systems are not properly managed, enterprises can lose valuable time and money when storage arrays are taken offline or shutdown. In these situations, applications are shutdown, storage devices are disconnected and reconnected, LUNs (logical unit numbers) are re-mapped, etc. While the storage arrays are offline, data flow and data ordering are disrupted and jeopardized.

DETAILED DESCRIPTION

Embodiments are directed to apparatus, systems, and methods for the online transitioning of data paths to subordinated external storage devices by way of a primary storage virtualizing device between cache enabled and cache disabled states in regards to the primary storage device. One embodiment is a primary storage array that switches between using and not using cache while being online or operational. The primary storage array can either use or not use cache (i.e., cache enabled or cache disabled) as FIFO (first in first out) storage for data destined for subordinated external storage. In one embodiment using asynchronous storage, one or more multiple gigabyte (GB) FIFO write caches are changed to a synchronous single cache write slot for various types of communication paths without disrupting data flow and ordering.

Users are able to transition from cache enabled to cache disabled or from cache disabled to cache enabled states without shutting down applications, disconnecting or reconnecting storage devices, remapping LUNs, etc. Data flow and data ordering to and from the storage devices are not disrupted or otherwise jeopardized while the primary storage array cache is being enabled or disabled. For example, data flow and data ordering are maintained during a transition from an asynchronous communication FIFO of many GBs to a single synchronous communication cache slot (such as a 48 KB-256 KB cache slot).

Figure 1:
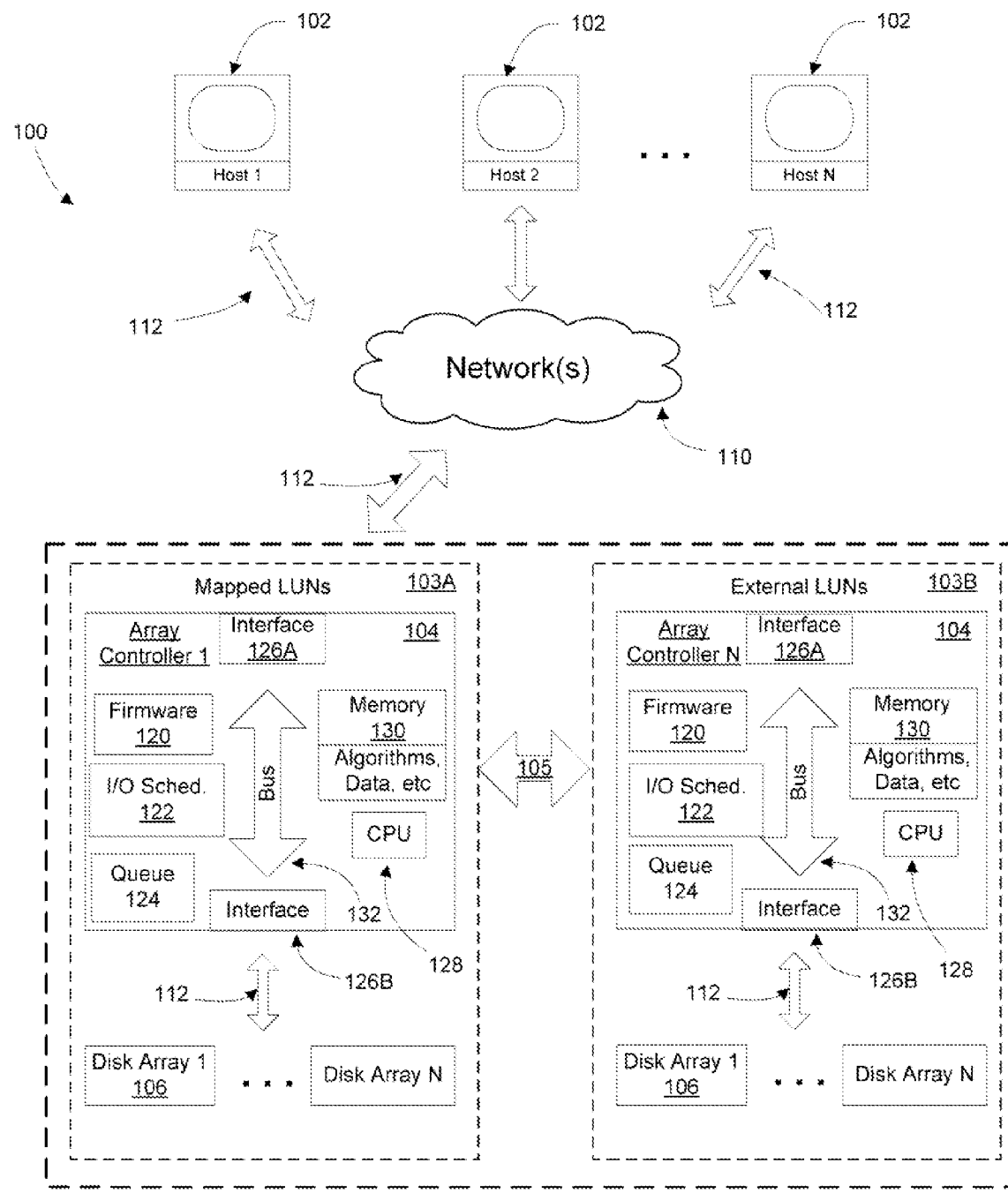
FIG. 1 is a block diagram of a combination primary/subordinate storage system in accordance with an exemplary embodiment of the present invention.

FIG. 1 is a block diagram of an exemplary distributed file or storage system 100 in accordance with an exemplary embodiment of the invention. By way of example, the system is a storage area network (SAN) that includes a plurality of host computers 102 and one or more primary storage devices 103A, and subordinate storage devices 103B that include one or more storage controllers 104 (shown by way of example as an array controller), and a plurality of storage devices 106 (shown by way of example as disk array 1 to disk array N).

In one embodiment, storage device 103A offers one or more hosts mapped or virtual LUNs in addition to its internal LUNs and storage device 103B is subordinated external or actual LUNs servicing as physical storage for the primary storage array's virtual LUNs. Although separate storage devices 103A, 103B exists, the hosts are provided with a large storage volume through 103A a single point of access and see al the available storage capacity without the physical attributes of various external storage devices. Storage device 103A communicates with storage device 103B over one or more communication paths, such iSCSI or as fiber channel (FC) and/or FC/SAN connectivity 105. External LUs (at the storage device 103B) are discovered by the storage device 103A and mapped in as internal logical devices (LDEVs) and assigned host facing LUNs, host ports, host groups, etc.

The host computers 102 (shown as host 1 to host N) are coupled to and communicate with the mapped LU or storage device 103A through one or more fabrics or networks 110. For instance, the hosts communicate with the array controller using a small computer system interface (SCSI) or other interface/commands over a fiber channel (FC). Further, by way of example, network 110 includes one or more of the internet, local area network (LAN), wide area network (WAN), etc. Communications links 112 are shown in the figure to represent communication paths or couplings between the hosts, controller, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 in storage device 103A receives I/O requests or commands from the host computers 102, such as data read requests, data write requests, maintenance requests, etc. These I/O requests are then forwarded or transmitted to the storage device 103B in either a cached or non-cached fashion. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including cache). CPU 128 performs operations and tasks necessary to manage the various data storage and data retrieval requests received from host computers 102. For instance, processor 128 is coupled to a host interface 126A that provides a bidirectional data communication interface to one or more host computers 102. Processor 128 is also coupled to an array interface 126B that provides a bidirectional data communication interface to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device. The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4 K, 16 K, 32 K, etc. . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment, the interfaces include one or more ports, such as FC target ports or host basing ports. For example, disk arrays have FC target ports for receiving I/O requests and data. The storage device 103A includes both target ports (example, ports connected to hosts for receiving I/O requests) and initiator ports (example, ports connected for transmitting I/O requests to storage device 103B).

In one embodiment the storage devices 103A, 103B are disk arrays and are physically located in a same data center. In another embodiment, the storage devices are located a great geographical distance apart in separate data centers. Further, although only two storage devices are shown, a SAN can include hundreds or thousands of such storage devices.

In one embodiment, the storage device 103A is a disk array that has one or more caches that are partitioned. For instance, part of the cache is designated for write requests from hosts and part of the cache is designated for read requests from hosts. By way of example, for a given cache partition, up to seventy five percent (75%) of the cache space is used for host writes that are yet to be de-staged or transmitted to a physical disk (including a disk located at storage device 103B). In this scenario, a minimum of twenty five percent (25%) of the total storage capacity is reserved for use as read cache.

Data in read cache can greatly speed up a host read if the desired data already resides in cache (example, due to a prior read of the same data or an automatic (example, 32 MB) read ahead). As shown in the table below, the write cache of the disk array is not de-staged to disk unless the maximum allotted cache capacity for the cache is at least thirty percent (30%) full. Beyond thirty percent (30%) full, the write cache is de-staged more and more aggressively and includes delaying or stopping new host writes until memory space is available in the cache (example, when the write cache is 75% or more full).

TABLE

Write De-stage Priority - By Percent Full

| Write cache % full | Data De-stage Priority | Data input flow control | Comments & Degree/granularity of Data Input Flow Control |
|---|---|---|---|
| <30% | None | None | Do not de-stage at all. Just leave the data in write cache |
| 30% | Low | None | De-stage data at a low priority until % write cache full is reduced to <30% |
| 50% | Medium | None | De-stage more aggressively until % write cache full <50% |
| 70% | High | partial | Implement step function static host input waits (e.g. 50 ms per I/O) and de-stage even more aggressively until <70% |
| 75% | Very High | temporarily stop | Refuse any new host write data until cache space <75% full. De-stage most aggressively until <75% |

In some scenarios, disk arrays inject a wait state or wait time on every new host write if the cache is more than a predetermined percentage full. For instance, if the write cache is between seventy to seventy five percent (70-75%) full, then a 50 millisecond (ms) wait state is imposed on every new host write. As a result of this wait state, some applications begin to experience warnings or failures at 20-30 ms response times. At even longer wait states (example, 50 ms delays), some applications send a warning to every user, and some applications may fail.

Figure 2:
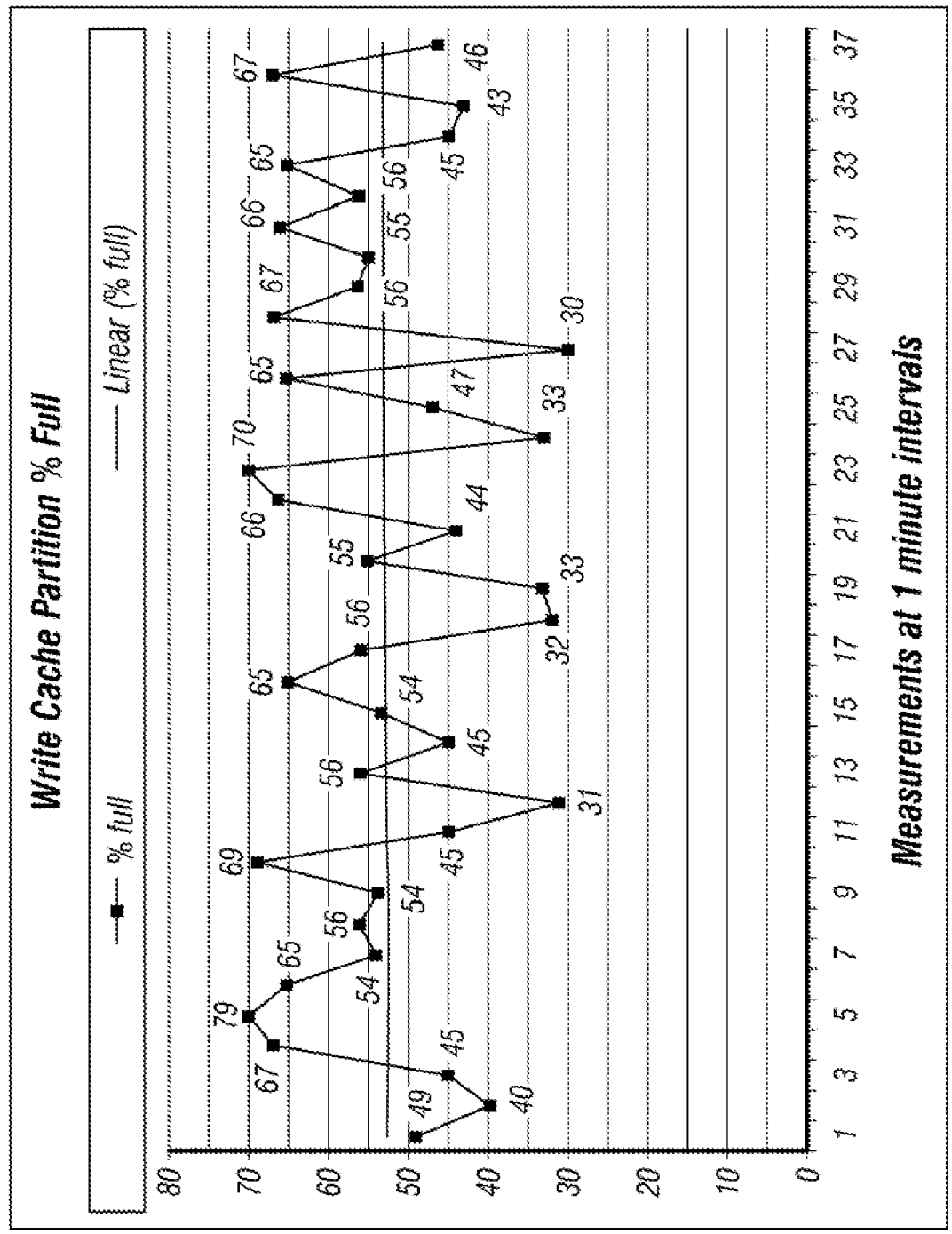
FIG. 2 is a graph showing an exemplary pattern of fullness for a primary storage device write cache partition over a time period in accordance with an exemplary embodiment of the present invention.

FIG. 2 is a graph 200 showing an exemplary pattern of fullness for a write cache partition over a time period in accordance with an exemplary embodiment of the present invention. The X-axis shows measurements of cache fullness at one minute intervals, and the Y-axis shows the measured percent fullness of the cache. The write cache full pattern illustrates a semi-flat trend line. As shown, the write cache usage typically does not go above seventy five percent (75%) or below thirty percent (30%).

Write cache data that has yet to be de-staged or flushed to physical disk is typically managed in quanta of 256 KB cache (segment) slots. All the cache slots involved with data waiting to be de-staged to a particular internal or external LUN are likely tracked via a table in disk array shared memory. Such tables are configured in a variety of ways and have one or more of the following characteristics: oldest entries are located in the (logical) bottom of the table, newest entries are added to the (logical) top of the table, entries are removed from the bottom of the list in chronological order, and de-staged to the final physical disk spindle destination (example, the internal or external LUN), a counter in shared memory keeps track of the number of entries in the table, cache slots from random locations are allocated as needed (example, based on Least Recently Used, LRU), disk array cache partitions vary in size (example, from a minimum of 4 GB or more to a maximum of 512 GB or more).

In the case of a throughput mismatch between a faster data producer (example, host) and a slower data consumer (example, physical disk), the write cache full percentage will tend to stay at an elevated level. This effect occurs in an external storage configuration where data is being received from a host at a rate faster than the primary storage device can forward the data to another subordinate storage device or destination. By way of example, this effect occurs in a storage array that receives data at a rate of 185 MB/s, while the primary storage array is only able to forward the data to the subordinated external array at a maximum of 105 MB/s. In this case, the use of cache partitions isolates the effects of throttling or stoppage of host I/Os (input/outputs) to only the involved LUNs and hosts.

In one exemplary embodiment, subordinated external storage LUNs are virtualized behind a primary disk array and have the option (at configuration time) of being configured as either cache enabled or cache disabled within the primary storage array. While data flow operations continuously occur in the cache enabled state, a user can change the storage device from a cache enabled to cache disabled or vice-versa. For example, a user may determine that cache can easily overfill due to host writes and decide to change the storage device to utilize cache disabled.

One embodiment provides an automatic and online method of converting an external LUN from cache enabled to cache disabled or from cache disabled to cache enabled. This process is performed online without disrupting data flow or data ordering between hosts and the storage devices. For instance, while a primary storage array is operating in an asynchronous mode, a primary storage array FIFO write cache is changed to a synchronous use single cache slot write cache.

By way of illustration, in order to transition from using 4-512 GB of cache to 256 KB of cache (one cache slot), exemplary embodiments create conditions for a continuously descending trend line (example, FIG. 3) without unnecessarily over-throttling. Specifically, no cache accumulation occurs over 30% unless there is a long term trend of producing data faster than consuming or transferring data. As such, one way to produce a descending long term write cache full trend line is through measured data input attenuation.

Instead of using a pre-set host response delay (example, 50 ms), exemplary embodiments alter a de-stage point, incrementally increase host delays, and periodically re-assess downward trends to the fullness of the cache partition. By way of illustration, assume that a primary storage device (example, a disk array) is configured in accordance with table 1 and performs according to FIG. 2. In this instance, one embodiment performs as follows:
 (1) Change the location at which no de-staging occurs from <30% full to 0% full for an individual logical device (LDEV, not the entire cache). Here, a cache full range of 0-30% will still result in active cache de-staging.
 (2) Slowly ratchet up injected host delays in 1 ms increments, while (in real-time) monitoring a current number of cache slots in the per-LUN write cache table count. Increments in injected host delays continue until a steady downward trend occurs. Further, it is noted that only host writes destined for the LDEV being examined will experience inserted delays.
 (3) Periodically re-assess the downward trend (example, forward moving average) to maintain the downward trend without using more host delay than necessary.

Figure 3:
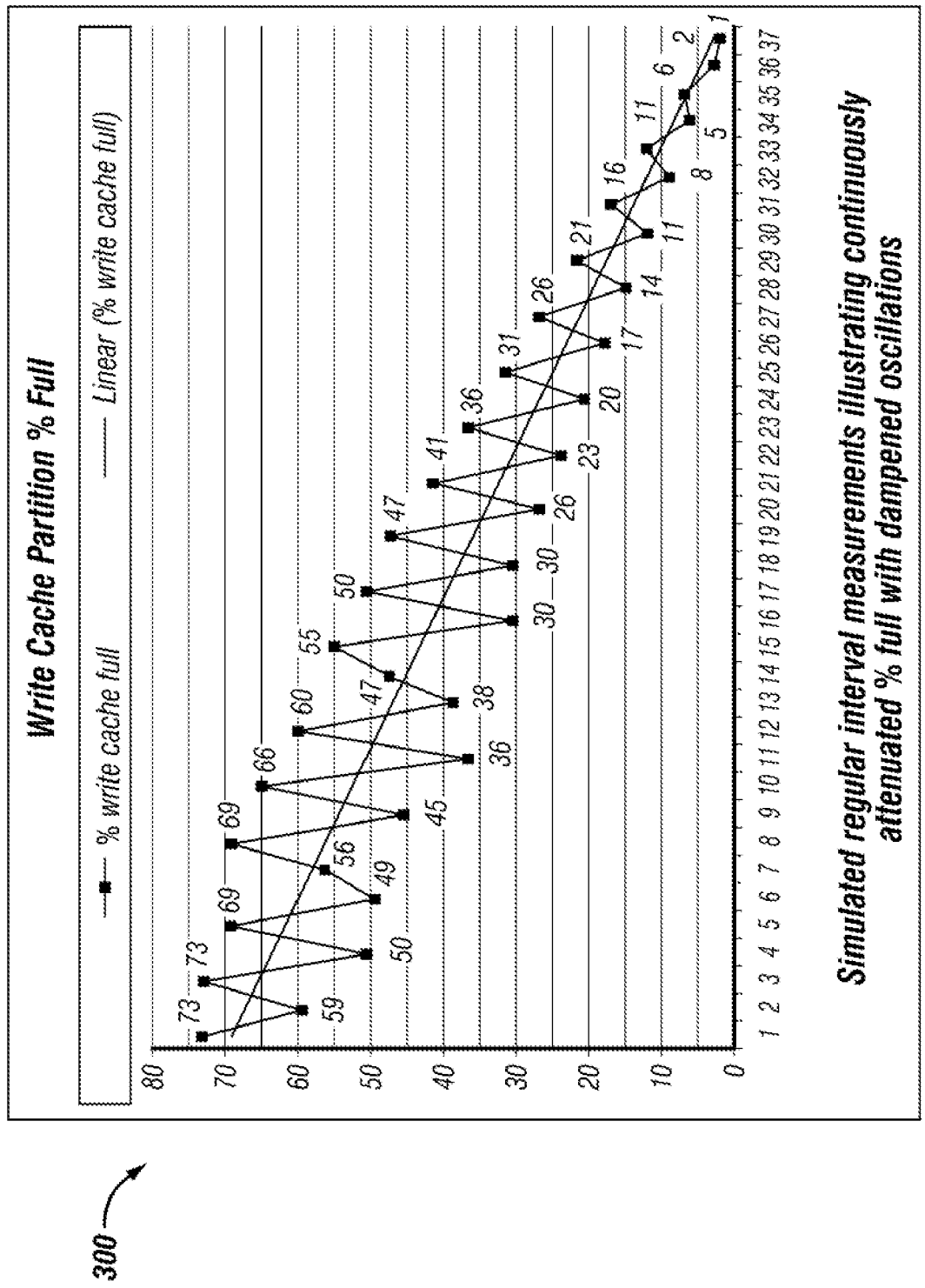
FIG. 3 is a graph showing an exemplary pattern of fullness for a primary storage device write cache partition over a time period while transitioning from enabled to disabled cache usage in accordance with an exemplary embodiment of the present invention.

FIG. 3 is a graph 300 showing an exemplary pattern of fullness for a write cache partition over a time period in accordance with an exemplary embodiment of the present invention. The X-axis shows measurements of cache fullness at one minute intervals, and the Y-axis shows the measured percent fullness of the cache. The write cache full pattern illustrates a continuous descending trend line. As shown, the write cache usage steadily decreases from an initial 70% full location to an empty cache state. Measurements are taken at regular intervals and illustrate continuous attenuated percentage full with dampening oscillations.

Embodiments consistently reduce write cache requirements without throttling any more than necessary. As such, no applications associated with the LDEV in question will get error messages or abort messages.

In one embodiment, the input throttling is increased in 1 ms increments until the value for the number of SM (storage mapped) table entries for a given external LUN (LDEV) reaches a downward tipping point. For instance, the increments continue until a downward trend line in the forward moving average occurs and there begins a consistent decline at a rate of removing write cache lot table entries (example, at least two old write cache lot table entries are removed for every one new entry added).

Once the tipping point delay level has been reached, the delay level is held or maintained. After this time, the delay level is periodically adjusted as necessary to compensate for varied input activity. This process continues until only one write cache slot table entry remains. At this point, one or more of the following occur:
 1) Invalidate all read cache slots for that LDEV, regardless of whether they resulted from a host read a host write. Under normal operations, a write to a cache slot (segment) eventually results in that cache slot's conversion into a read cache slot. Since this embodiment is attempting to get to a single write cache slot, this behavior is suspended during the transition. Therefore, after a write cache slot is de-staged to disk, the cache slot is then freed for reuse, instead of being converted to a read cache slot. In addition, any cache slots that were filled due to host reads are also freed up.
 2) Convert the LDEV to a non-cached configuration that allows the synchronous use of a single slot (duplexed). This process completes an orderly online transition from a variable sized asynchronous communication FIFO to a fixed size synchronous communication FIFO utilizing a single cache slot. At the same time, this activity does not alter read cache management, which is separate from write cache management and is at least 25% of the total cache (or partition) capacity (even when the write cache is only a single slot). Least Recently Used (LRU) read cache slots are freed and re-used as needed.
 3) Restore normal settings. For example, one embodiment removes all host delays and sets the no need to de-stage cached writes point back to <30% cache full.

In one exemplary embodiment, the operator knows the maximum level of latency that the applications can tolerate. Part of the interface (such as the GUI, graphical user interface or the CLI, command line interface) is to provide the operator with the option to specify a customized not-to-exceed application response time in milliseconds (example, 30 ms) as well as a maximum time-to-complete the transition value (example, hours or minutes).

If the operator does not exercise the ability to specify a not-to-exceed value, one embodiment automatically ratchets the injected delay. For instance, the delay is incrementally increased as high as necessary, up to a preset maximum (example, 50 ms) to cause a timely downward trend, even if application warnings appear.

If the operator does exercise the ability to specify a not-to-exceed value, the embodiment will not exceed the specified values. For instance, assume the operator specifies a not-to-exceed value of 30 ms with a maximum time to complete of 24 hours. The specified values are not exceeded even if they produce a longer time for the desired outcome (i.e., until a time of lower activity allows for a tipping point) or an abort of the transition effort due to a timeout.

In one exemplary embodiment, the storage array limits (during the transition period) the host sessions (nexus') providing new write data to the write cache to those sessions that already existed when the conversion process was ordered. New host sessions that are initiated during the transition process are handled in a write through mode. In other words, the new sessions are limited to the synchronous use of a single cache slot (i.e. a temporary one, while the transition completes). After the transition completes, all host sessions are converted to use the same single write cache slot.

Figure 4:
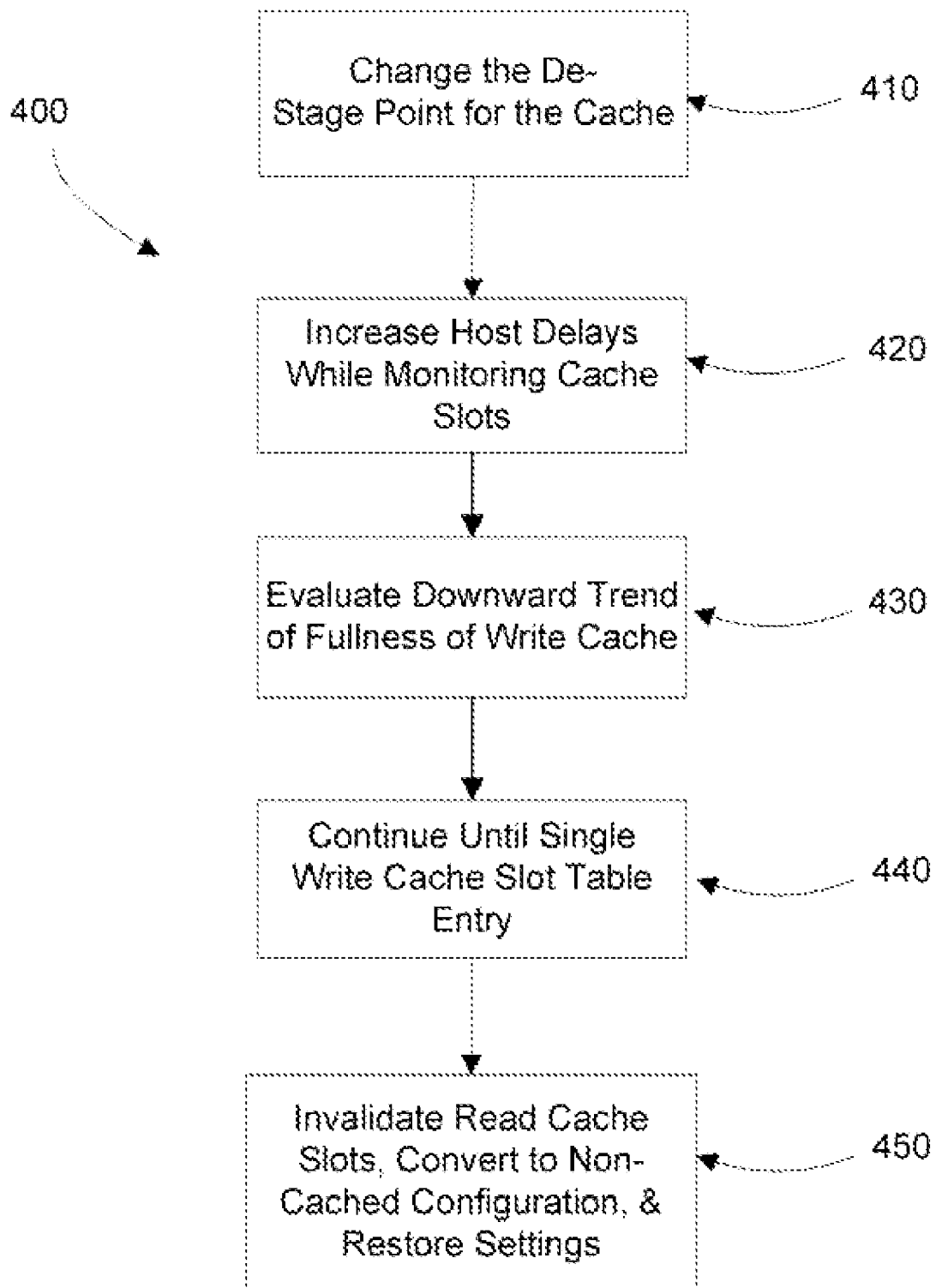
FIG. 4 is a flow diagram for transitioning a primary storage device from enabled to disabled cache usage in accordance with an exemplary embodiment of the present invention.

FIG. 4 is a flow diagram 400 for transitioning a storage device from enabled to disabled cache usage in accordance with an exemplary embodiment of the present invention.

According to block 410, the de-stage point for the cache for a particular LUN is changed. For instance, one or more parameters of a cache are altered so de-staging of data occurs when the cache has any data. Thus, a cache having ≧0% will commence de-staging operations.

According to block 420, the host delays are incrementally increased while the cache slots are monitored. For instance, the injected host delays are increased (example, with 1 or 2 ms increments) and the current number of cache slots is simultaneously monitored. The host delays are increased until a downward trend occurs in the fullness of the write cache partition (example, see FIG. 3).

According to block 430, the downward trend of the fullness of the write cache is evaluated. For instance, the downward trend (example, forward moving average) is periodically assessed to maintain the downward trend without further increasing the number of host delays.

According to block 440, the process continues until a single write cache slot table entry exists. For instance, old write cache lot table entries are removed at a rate greater than new entries are added. This reduction continues until a single write cache slot table entry remains.

According to block 450, once a single write cache slot table entry exists, then all read cache slots are invalidated for that LDEV, the LDEV is converted to a non-cached configuration that allows the synchronous use of a single slot, and normal settings are restored (example, host delays are removed and the no de-stage point is set back to its previous point).

Exemplary embodiments eliminate the need to manually transition from a cached to non-cached communication path since this transition occurs while the host application is online. This transition occurs in an automated and regulated fashion, while the application remains online and active, without disrupting data ordering or data availability.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    incrementing a time period for delaying host requests received at a cache of a storage array until a rate of receiving new cache entries is less than a rate of flushing cache entries from the cache;
    converting the storage array from a first state with the cache enabled to a second state with the cache disabled while the storage array remains online; and increasing the time period for delaying host requests using one millisecond increments until a number of storage mapped (SM) table entries for the storage array begins a consistent decline.

2. The method of claim 1 further comprising, changing a parameter of the cache that increases a rate at which data is flushed from the cache.

3. The method of claim 1 further comprising, invalidating all read cache slots in the cache when a single write cache slot remains for the cache.

4. The method of claim 1 further comprising, converting the storage array from using asynchronous communication to using synchronous communication.

5. The method of claim 1 further comprising, setting the time period for delaying host requests to zero when a single write cache slot remains for the cache.

6. The method of claim 1 further comprising, periodically adjusting the time period for delaying the host requests to compensate for varied input/output (I/O) requests received at the storage array.

7. The method of claim 1 further comprising, increasing the time period for delaying host requests to enable data in the cache to drain.

8. A non-transitory computer readable medium having instructions for causing a computer to execute a method, comprising:
   changing a time period for delaying host requests received at a cache of a storage device until a percentage full of the cache decreases;
   converting the storage device from using a cache enabled state to using a cache disabled state while the storage device continues to transmit data to a storage array; and
   increasing the time period for delaying host requests using one millisecond increments until a number of storage mapped (SM) table entries for the storage device begins a consistent decline.

9. The non-transitory computer readable medium of claim 8 further comprising, changing the time period to create conditions for a continuously descending trend line plotted in a graph of fullness of cache versus time.

10. The non-transitory computer readable medium of claim 8 further comprising, changing the time period to eliminate data waiting to be flushed from the cache.

11. The non-transitory computer readable medium of claim 8 further comprising, incrementing the time period using one millisecond increments.

12. The non-transitory computer readable medium of claim 8 further comprising, monitoring a number of cache slots in a write cache table of the cache while the time period is being incremented.

13. The non-transitory computer readable medium of claim 8 further comprising, reducing an amount of data waiting in the cache to be flushed without causing applications associated with the storage device to receive error messages or abort messages.

14. The non-transitory computer readable medium of claim 8 further comprising, receiving input from a user, the input specifying a time period for converting the storage device from the cache enabled state to the cache disabled state.

15. A disk array, comprising:
   a first port that receives input/output (I/O) requests from a host;
   a second port that sends the I/O requests to another disk array;
   a processor that executes an algorithm to:
      vary a time period for delaying host requests received at a cache of the disk array until a percentage full of the cache begins to decline;
      alter the disk array from a cache enabled state to a cache disabled state while the disk array remains online for data transmission to the another disk array; and
   increase the time period for delaying host requests using one millisecond increments until a number of storage mapped (SM) table entries for the disk array begins a consistent decline.

16. The storage device of claim 15, wherein the cache is altered from a multi-slot write cache using asynchronous communication to a single-slot write cache using synchronous communication.

17. The storage device of claim 15, wherein the another disk array is a virtualized external storage device behind the disk array.

18. The storage device of claim 15, wherein the disk array is altered from the cache enabled state to the cache disabled state while maintaining data ordering and online data flow in the disk array.

19. The storage device of claim 15, wherein the processor further executes the algorithm to dampen oscillations occurring over time between measurements of fullness of the cache.

* * * * *